US005690323A

United States Patent [19]
Püttmer et al.

[11] Patent Number: 5,690,323
[45] Date of Patent: Nov. 25, 1997

[54] HOLDING DEVICE FOR PERIPHERALLY HOLDING WORKPIECES OF ANY DESIRED OUTLINE

[75] Inventors: Hermann Püttmer, Kirchberg/Murr; Peter Abraham, Ilsfeld, both of Germany

[73] Assignee: Götz GmbH, Ludwigsburg, Germany

[21] Appl. No.: 633,187

[22] Filed: Apr. 16, 1996

[30]  Foreign Application Priority Data

Apr. 29, 1995 [DE] Germany ............... 195 15 894.6
Oct. 24, 1995 [DE] Germany ............... 195 39 488.7

[51] Int. Cl.$^6$ ..................................... B23Q 3/00
[52] U.S. Cl. ..................... 269/20; 269/61; 269/266
[58] Field of Search ............... 269/20, 25, 26, 269/58, 61, 74, 77, 78, 108, 130, 131, 265, 266, 270, 271, 279; 279/4.1, 4.11, 4.12

[56]  References Cited

U.S. PATENT DOCUMENTS

| 598,332 | 2/1898 | Allen | 269/279 |
|---|---|---|---|
| 2,113,509 | 4/1938 | Groene et al. | 269/267 |
| 2,354,794 | 8/1944 | Buehler | 269/25 |
| 2,985,455 | 5/1961 | Powell | 269/270 |
| 3,436,071 | 4/1969 | Petruccelli | 269/20 |
| 3,851,869 | 12/1974 | Damewood | 269/21 |
| 3,868,101 | 2/1975 | Nozaki et al. | 269/25 |

FOREIGN PATENT DOCUMENTS

| PS 8 71 280 | 3/1953 | Germany . |
|---|---|---|
| 30 10 096 A1 | 3/1980 | Germany . |
| 37 14 336 C1 | 4/1987 | Germany . |
| 43 11 110 A1 | 4/1993 | Germany . |

Primary Examiner—Robert C. Watson
Assistant Examiner—Thomas W. Lynch
Attorney, Agent, or Firm—Browdy and Neimark

[57]  ABSTRACT

A holding device for peripherally holding workpieces of any desired outline is provided, comprising two shape-adjustable jaws arranged opposite one another on a base body. The gripping surfaces of the jaws are constituted a plurality of plungers able to be moved independently against such workpiece by fluid power and arrested in a work holding position. The base body is rotatably supported in a clasping device for turning about an axis perpendicular to the work holding direction and possesses a connection member for the fluid power operation of the fluid power drive of the plungers at least. Furthermore a counter-connection member connected with fluid power lines is adapted to be thrust against the connection member and in the stationary state of the base body is able to be coupled with the same in a certain angular setting, the base body possessing valve means for locking the positions of the plungers in the clamping state thereof after uncoupling the counter-connection member. This means that it is possible to rapidly and reliably clamp and hold workpieces with an elaborate outline and turn same in the clamped state.

25 Claims, 5 Drawing Sheets

HOLDING DEVICE FOR PERIPHERALLY HOLDING WORKPIECES OF ANY DESIRED OUTLINE

BACKGROUND OF THE INVENTION

The invention relates to a holding device for peripherally holding workpieces of any desired outline, comprising a base body, two shape-adjustable jaws arranged opposite one another on said base body, said jaws including a plurality of plungers able to be moved independently against such workpiece by fluid power and forming gripping surfaces on said jaws and means for arresting said plungers in a work holding position.

THE PRIOR ART

Such a work holding device as disclosed in the German patent publication 4,202,032 serves for holding workpieces of any desired peripheral outline, for example in drilling and milling machines, the workpieces being able to be rapidly and simply clamped and released. A particular problem is however met with in connection with certain workpieces, as for example, turbine vanes or the like shaped parts, in the case of which both a middle region with an elaborate peripheral outline and also the anchoring elements at each end must be produced. During machining it is in this case necessary both to turn the workpiece exactly about a predetermined axis, and to arrest it in various different angular settings, something not readily achieved using conventional workpiece holding fixtures.

SHORT SUMMARY OF THE INVENTION

One object of the invention is consequently to so improve upon the known work holding device that workpieces with an intricate peripheral outline may be rapidly and reliably clamped in place and may be turned about a predetermined axis while so held.

In order to achieve these and/or other objects of the present invention, the base body is rotatably supported in a clasping device for turning about an axis perpendicular to the work holding direction and possesses a connection member for the fluid power operation of the fluid power drive of the plungers at least. A counter-connection member connected with fluid power lines is adapted to be thrust against the connection member and in the stationary state of the base body is able to be coupled with the same in a certain angular setting. The base body possesses valve means for locking the positions of the plungers in the clamping state thereof after uncoupling the counter-connection member.

With the holding device there is the advantage that it can be moved up to a workpiece held in a rotatable fashion that the axis of rotation thereof coincides with the axis of rotation of the base body. In this position the plungers of the shape-adjustable jaws are actuated so that they clamp on a region of the workpiece with an intricate peripheral outline, as for example the periphery of a turbine vane. After uncoupling the counter-connection member the plungers will remain in the stressed or clamping condition so that the base body is again able to be freely rotated and constitutes an additional rotary bearing means for the workpiece to be machined. For releasing and re-clamping the workpiece or another workpiece it is merely necessary to move the counter-connection member into position for respective operation of the plungers constituting the gripping surfaces so that the respective fluid power operation may be performed. Since the gripping surfaces are adapted rapidly and automatically by the independently moving plungers to the respective outline of the workpiece and the holding device has been previously so positioned that the axis of rotation of the base body coincides with the axis of rotation of the workpiece, a change-over between clamping and releasing may be performed very rapidly, reliably and exactly.

In accordance with an advantageous embodiment of the invention, the base body is designed in the form of a circular disk and is rotatably carried at its periphery. The peripheral bearing means in the base body preferably comprises a plurality of roller bearings, which may engage the peripheral surface of the base body.

For rotation of the base body it is convenient to provide a drive motor. The drive motor is secured to the clasping device and more particularly has at least one drive gear wheel meshing with a gear ring extending around the periphery or part thereof on the base body. This means that there is an exact angular positioning of the base body and accordingly of the workpiece held.

In order to move the holding device to the side past a pre-clamped workpiece, the base body conveniently possesses a through recess extending laterally from a clamping opening, laterally delimited by the two shape-adjustable jaws, as far as the outer periphery of the holding device, said recess extending also through the clasping device. During lateral positioning movement of the holding device it is hence possible for the pre-clamped workpiece to move through the recess as far as the clamping opening between the shape-adjustable jaws in order to be held. Since the base body consequently also possesses an interruption in the gear ring, it is an advantage to provide two drive gear wheels, whose distance apart is equal to at least the width of the recess so that a continuous driving action is ensured.

In accordance with an advantageous alternative design the base body and the clasping device are each made in two portions, the portions thereof being designed so that same may be pivoted apart for introduction and removal of the workpiece to be held. The clasping device in this case may conveniently comprise a first portion adapted to run on a guide device and a second portion connected by a pivot joint with the first portion, such pivoting taking place in such a manner that a first portion of the base body remains in the first portion of the clasping device and a second portion of the base body is pivoted as well in the second portion of the clasping device. By performing a sufficiently large pivotal movement it is also possible for large workpieces to be readily placed between the shape-adjustable jaws.

The two portions of the base body together constitute a complete or uninterrupted circular disk, which may be simply rotatably supported and be driven by a single drive wheel.

For automatic or controlled pivoting of its portions the clasping device preferably comprises a more particularly fluid power driven servo member.

In order to produce an arrangement which is reliable and firm even during rotation of the base body in the clasping device as well, a locking device is provided locking the two portions of the clasping device in the closed condition, such locking device preferably being fluid power operated or fluid controlled.

For coupling with the connection member the counter-connection member is preferably designed so that it may be shifted by fluid power. This means that rapid coupling and uncoupling is possible.

In order for the engineer to provide for a relatively small stroke of the plungers and in order to be able nevertheless to hold workpieces of different sizes it is a advantage if the two shape-adjustable jaws are arranged on slides able to be moved in relation to each other by fluid power. In this case even more variability may be provided for if the shape-adjustable jaws are able to be coupled and/or locked with the slides by fluid power means so that different shape-adjustable jaws may be provided which are able to be alternatively secured to the slide and may for instance be taken from a magazine.

For indexing or positioning the base body in selected angular settings it is convenient to employ at least one fluid power hold brake, which may be more especially designed in the form of a block brake acting on the outer periphery of the base body.

For positioning the holding device in relation to the pre-clamped tool or workpiece it is convenient for the holding device to possess a drive device for horizontal sliding in the axial direction, or perpendicularly thereto, on a guide device.

The means for positioning the plungers in the clamping setting are preferably designed in the form of fluid power actuated shut off valves, it being preferred to employ shut off valves for maintaining the plunger positions after uncoupling the counter-connection member.

Even better clamping of the workpiece by the plungers while simultaneously preventing damage to the workpiece at the points of contact by the plungers is possible if each shape-adjustable jaw possesses a clamping band extending over the plungers and preferably adapted to engage the plungers under the action of resilient force.

As a fluid power control means it is preferred to utilize a hydraulic control system.

BRIEF DESCRIPTION OF THE DRAWINGS

Further advantageous developments and convenient forms of the invention will be understood from the following detailed descriptive disclosure of two embodiments thereof in conjunction with the accompanying drawings.

DETAILED ACCOUNT OF WORKING EMBODIMENTS OF THE INVENTION

Figure 1:
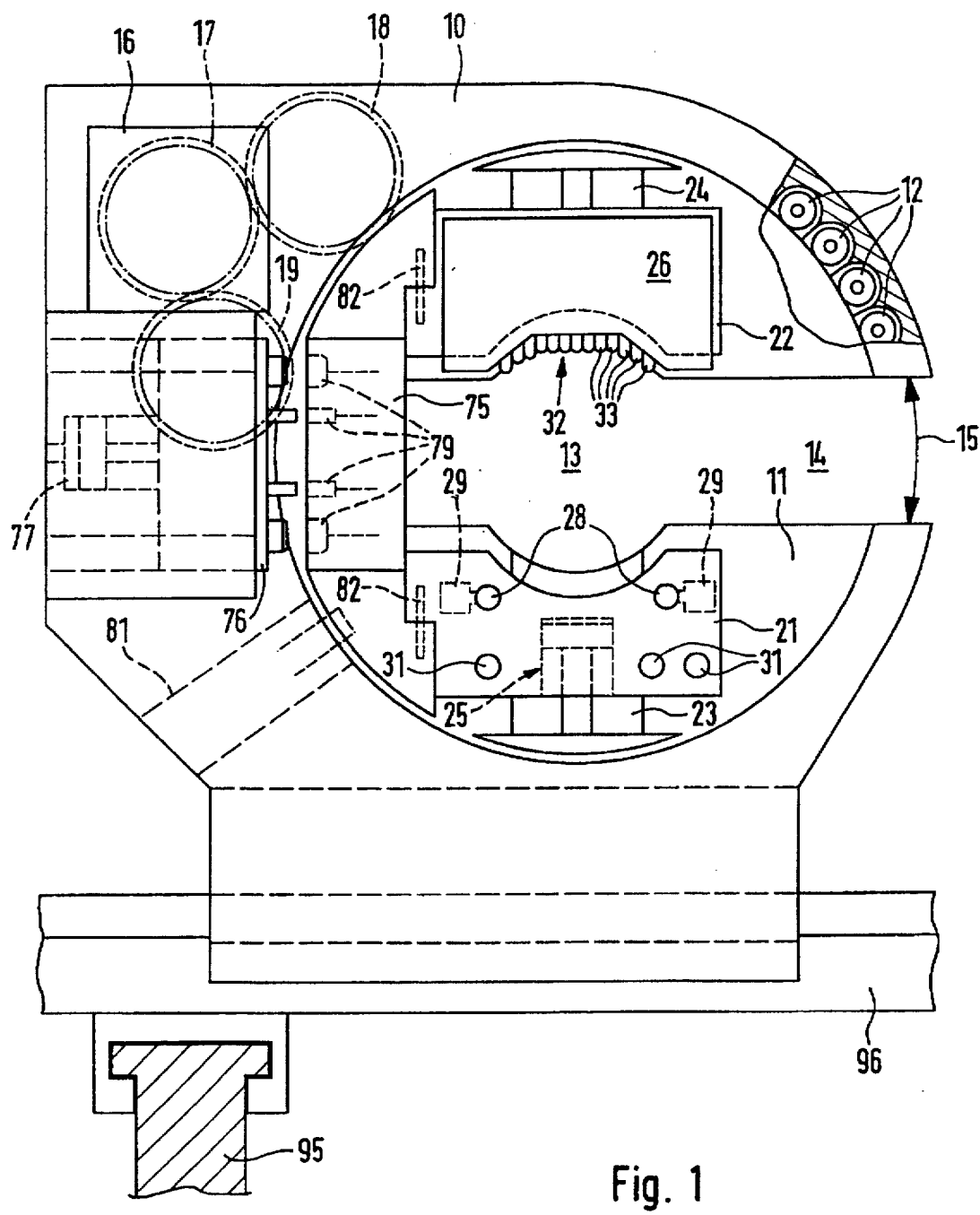
FIG. 1 is a lateral elevation of a holding device with a shape-adjustable jaw mounted on one of the two slides, in accordance with a first embodiment of the invention.
Figure 2:
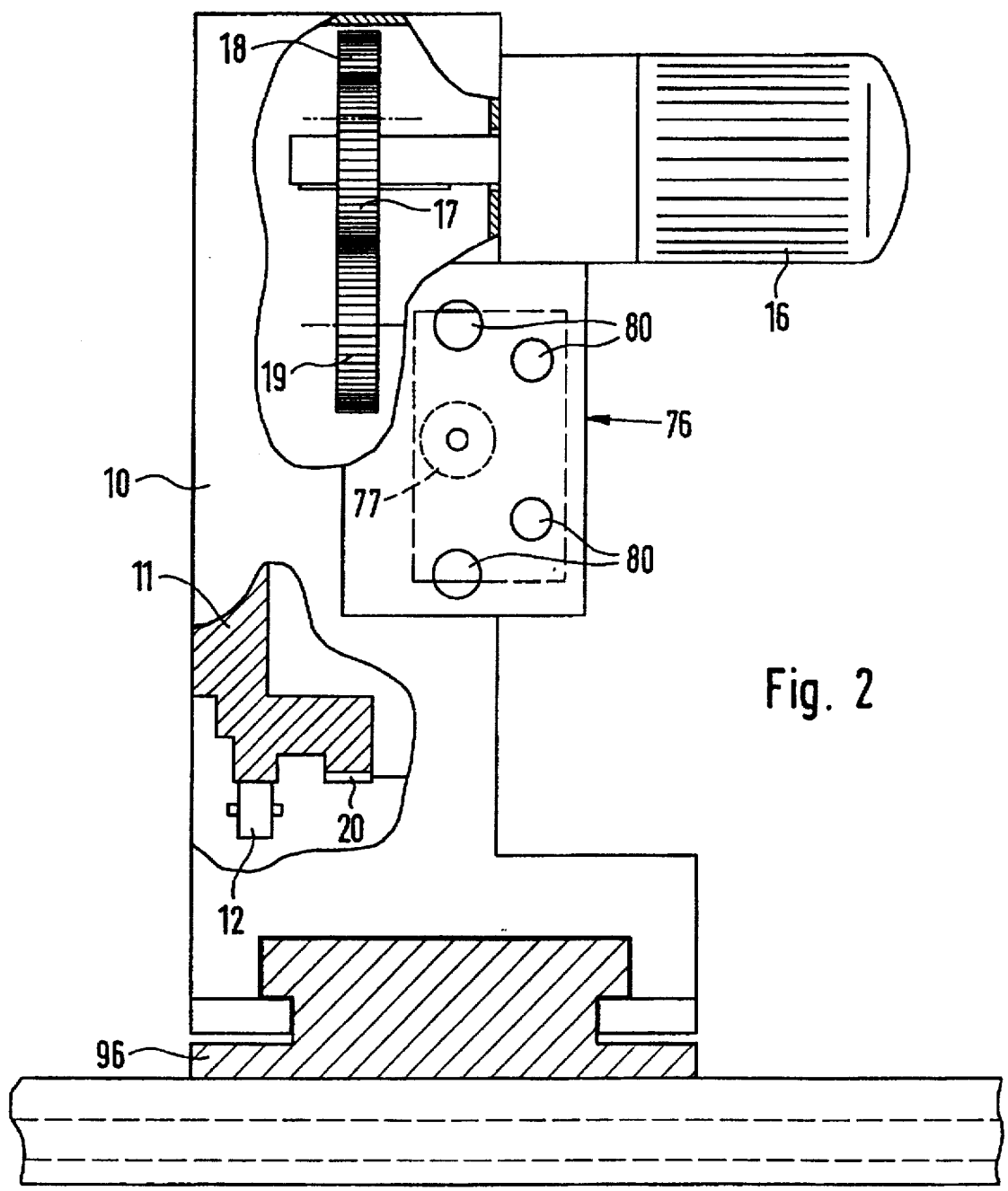
FIG. 2 is an end-on view of the holding device with the rear side, having the supply ports, of the counter-connection member.

The holding device depicted in FIGS. 1 and 2 comprises as its main parts a clasping device 10 in which a base body 11 having the form of a circular disk is rotatably supported. In its center the base body 11 possesses a clamping opening 13 extending axially through the hose body 11 and in which a workpiece to be held is positioned. Starting at this clamping opening 13 there extends a slot-like recess 14 which also runs through the base body 11 as far as the edge of the base body 11 so that the base body 11 may be slid laterally over a workpiece to be held, such workpiece being introduced through the opening 14. The recess 14 is continued some distance on the opposite side of the clamping opening 13 as well.

The clasping device 10, which fits around the base body 11 like a ring, has an interruption 15, whose width is the same as the width of the recess 14 and which in the angular setting of the base body 11 illustrated in FIG. 1 is aligned with the horizontally extending recess 14. The interruption 15 naturally also interrupts the row of bearing rollers 12.

A drive motor 16 flange-mounted to the side of the clasping device 10 drives two drive gear wheels 18 and 19 for the base body 11 via a first gear wheel 17. Such drive gear wheels are in mesh with a gear ring 20 on the base body 11, which may be placed adjacent to the race ring of the bearing rollers 12 and for example can be screwed to the base body 11 in a manner which is not illustrated. The points of meshing of the two drive gear wheels 18 and 19 on the gear ring 20 are spaced apart by a distance which is larger than the width of the recess 14 so that when such recess 14 moves past the drive gear wheels 18 and 19 at least one drive gear wheel will remain in mesh with the gear ring 20, which is necessarily interrupted at the recess 14.

Two slides 21 and 22 are arranged opposite to one another at the clamping opening 13 and run in a sliding fashion in guide tracks 23 and 24 for motion in relation to one another. Such sliding movement is produced using hydraulic cylinders 25 in the slides 21 and 22, of which only one is depicted diagrammatically.

Figure 4:
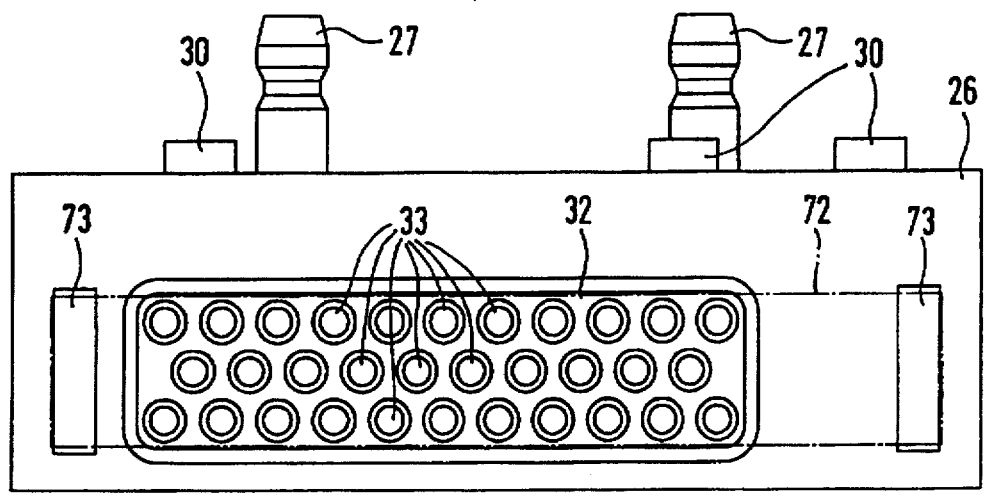
FIG. 4 is an elevation of the shape-adjustable jaw depicted in FIG. 3 from the plunger side thereof.

It is now possible for shape-adjustable jaws 26 to be plugged on the slides 21 and 22 and fixed in place, FIG. 1 only showing one shape-adjustable jaw 26 plugged on or slipped over the slide 22, which in terms of FIG. 1 is the upper one. This shape-adjustable jaw is illustrated in more detail in FIGS. 3 and 4 and may in principle be designed in accordance with the prior art acknowledged supra. On plugging the shape-adjustable jaw 26 in position two holding bolts 27 fit into two holding openings 28 and are respectively locked by means of a locking device 29. One possible design of such a locking device 29 is illustrated in more detail in FIG. 6. Furthermore hydraulic connection means 30 on the shape-adjustable jaws 26 fit sealingly into corresponding ports 31 in the slide 21 or, respectively, 22. The number of locking bolts 27 may be freely selected in accordance with requirements and the number of hydraulic connection means 30 and, respectively, connection ports 31 will depend on the respective needs.

Figure 3:
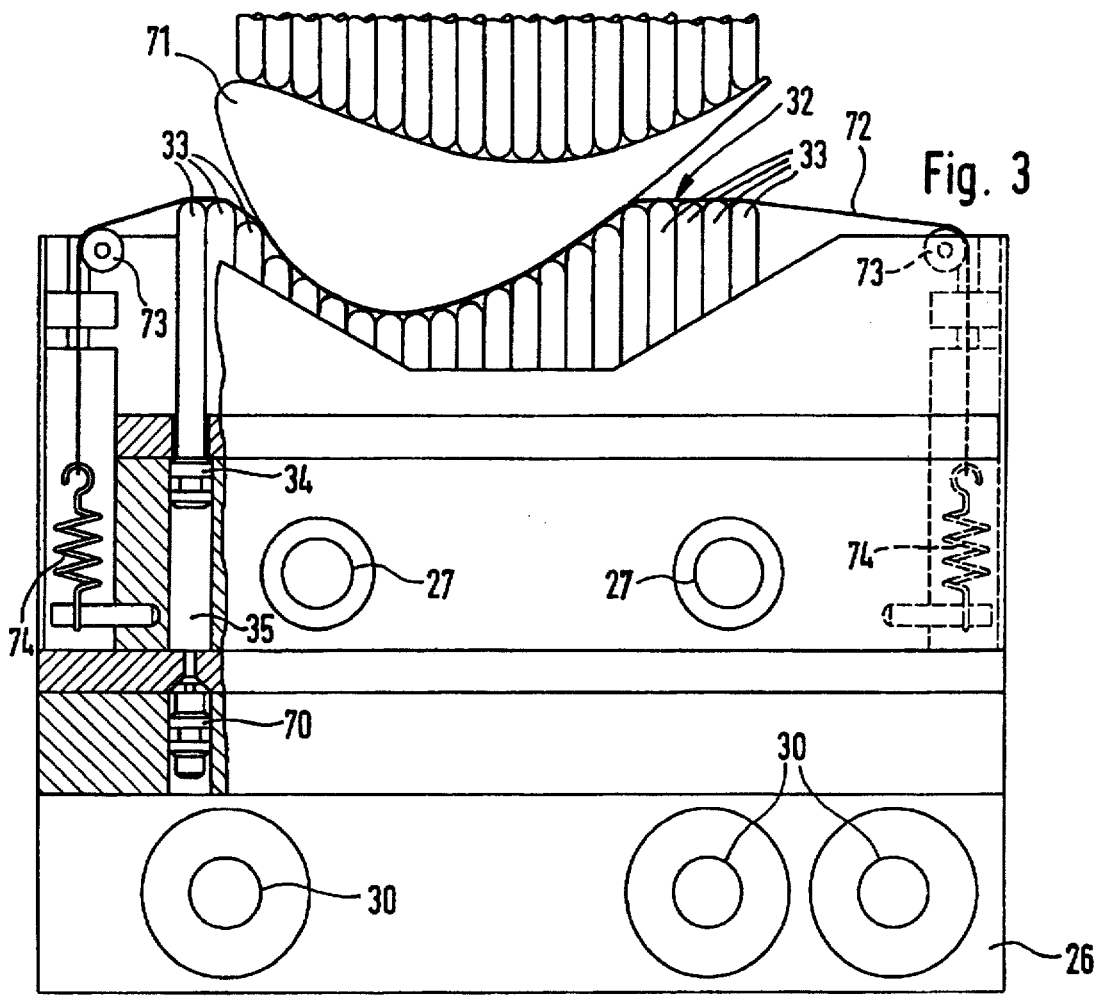
FIG. 3 is an elevation of one shape-adjustable jaw as seen from below and partially in section.

Each of the two shape-adjustable jaws 26 possesses a gripping surface 32, defined by a plurality of plungers 33 (or clamping plungers) able to be moved independently of one another for a given stroke hydraulically. In FIG. 3 one of the plungers 33 is depicted in more detail, i.e. the respective region of the shape-adjustable jaw 26 is shown sectioned. The inner terminal part of each plunger 33 is provided with a plunger piston 34, which is arranged in a plunger cylinder 35 for sliding movement under hydraulic action. The cylinder space of the plunger cylinder 35 is able to be shut off by a hydraulically actuated shut off valve 70. The necessary hydraulic manifolds or distributors and hydraulic lines leading to the hydraulic connection means 30 are omitted in order to make the drawing more straightforward.

To extend the plungers 33, the shut off valves 70 are hydraulically moved into the open setting so that hydraulic power fluid may enter the plunger cylinders 35 and cause outward displacement of the plungers 33. Their motion is limited by abutment against the workpiece 71 to be held, said workpiece being in the case of FIG. 3 a turbine vane. Plungers 33 which do not contact the workpiece 71 will be extended as far as their terminal positions. After reaching the holding position the shut off valves 70 are moved into their shut positions so that the plungers 33 are locked in the holding position. Check valves (not illustrated) ensure that the shut off valves 70 remain in the shut condition even following failure of the external pressure supply. The manner of operation of the shape-adjustable jaws 26 is described in even more detail in the prior art publication art mentioned in the introduction hereto.

A clamping band 72 extends around the gripping surface 32, such band being for instance of metal sheet. This clamping band extends in the longitudinal direction over the gripping surface 32 and is trained over bend rollers 73 at either side of the gripping surface 32 and then into the interior of the shape-adjustable jaw 26. The two ends of the clamping band 72 are connected with tautening springs 74, which are mounted in the interior of the shape-adjustable jaw 26. This means that the clamping band 72 is at all times kept taut whatever the position of the individual plungers 33 and extends between the workpiece 71 to be held and the ends of the plungers 33.

At the end of the slot-like recess 14 a hydraulic connection member 75 is secured to the base body 11 symmetrically in relation to the slides 21 and 22. In the starting or neutral position illustrated in FIG. 1 of the base body 11 a counter-connection member 76 is opposite to this connection member 75, such counter-connection member being arranged on the clasping device 10 on which it may be hydraulically moved. For this purpose there is a hydraulic cylinder 77 in the interior of the counter-connection member 76. On operation of the hydraulic cylinder 77 the counter-connection member 76 will be moved toward the connection member 75, hydraulic connection means 78 on the counter-connection member 76 being moved into corresponding connection ports 79 in the connection member 75 with a sealing action, i.e. coupled with them. The hydraulic cylinder connection means 78 are in this respect connected via ducts (not illustrated) in the interior of the counter-connection member 76 with connection ports 80 on the rear side of the counter-connection member 76. These connection ports 80 are able to be connected with hydraulic lines for control and supply functions, not illustrated.

For holding and clamping a workpiece the workpiece is positioned in the clamping opening 13. Then the counter-connection member 76 is driven hydraulically and coupled with the connection member 75. The base body 11 is the while locked in place by a hydraulic hold brake 81, which is illustrated in more detail in FIG. 5. Now the slides 21 and 22 are moved hydraulically toward one another by supplying hydraulic power through the respective pressure lines via the counter-connection member 76. The internal lines, which lead in the connection member 75 to the slides 21 and 22, are here not illustrated in detail. The pressure connection between the connection member 75 and the moving slides 21 and 22 is for instance produced by using movable pressure pipes 82, which in the present case are only illustrated diagrammatically. Finally the plungers 33 are actuated or, respectively, caused to extend until the workpiece 71 is held between them as shown in FIG. 3. Now the counter-connection member 76 is again uncoupled from the connection member 75 and returned to the position depicted in FIG. 1. Check valves or other flow checking means will ensure that the plungers 33 are kept in their clamping settings. It is now possible for the base body 11 to be turned together with the held workpiece 71. This may be done by means of the drive motor 16 or by entrainment of the base body 11 when the workpiece 71 is turned.

For releasing the workpiece 71 the base body 11 is moved back into the position illustrated in FIG. 1 and locked, the counter-connection member 76 is coupled to the connection member 75 and release of the workpiece is effected by retraction of the plungers 33 and slides 21 and 22.

Figure 5:
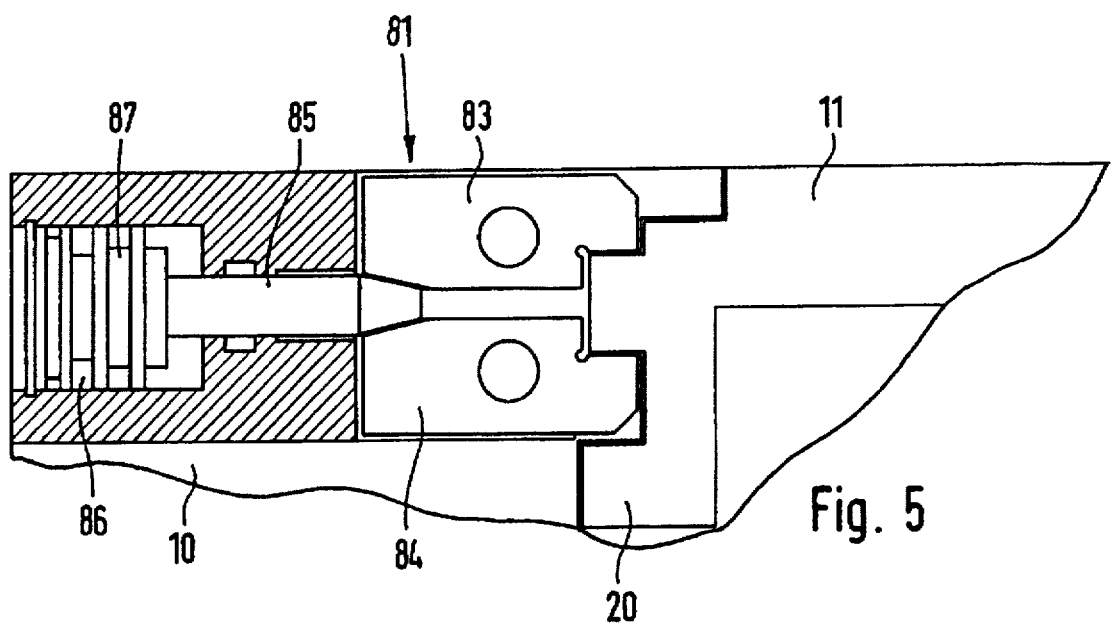
FIG. 5 shows a hold brake designed in the form of a block brake for the base body.

The hold brake 81 illustrated in FIG. 5 in more detail has as its main parts two pivotally mounted brake jaws 83 and 84 fitting around the base body 11 at the bearing region thereof. For the opposite side a conically tapering operating bolt 85 extends between the brake jaws 83 and 84. At the other terminal region thereof this operating bolt 85 bears a piston 87 able to move in a hydraulic cylinder chamber 86. For braking or, respectively, for locking the base body 11 in position, the cylinder chamber 86 is put under hydraulic pressure so that the piston 87, together with the operating bolt 85 is moved toward the base body 11. Owing to the conically tapering end of the operating bolt 85 the two brake jaws 83 and 84 are then spread apart at this position so that owing to the pivotal mounting thereof at the opposite active terminal part they clamp the base body 11 between them and hold it fast.

Figure 6:
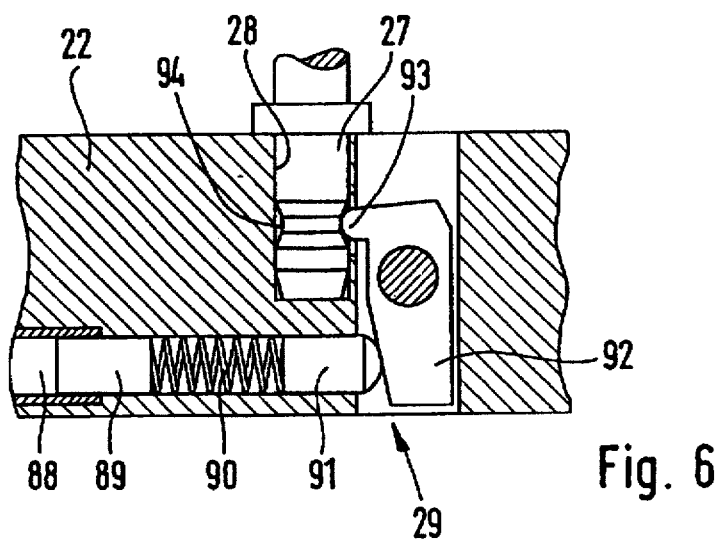
FIG. 6 shows a hydraulic locking device for a hold pin of the shape-adjustable jaw.

In FIG. 6 one of the locking devices 29 for one of the locking bolts 27 of the shape-adjustable jaw 26 in the slide 22 will be seen in more detail. On plugging the shape-adjustable jaws 26 on the slides 21 and 22 the locking bolts 27 of the shape-adjustable jaws 26 fit into the holding openings 28 in the slides 21 and 22. For locking a hydraulic cylinder 88 is then put under pressure so that a locking piston 89, acting via spring 90, moves a locking bolt 91 against a pivotally mounted locking lever 92 so that its other end provided with a locking spur 93 is moved into a periphery annular groove 94 in the locking bolt 27 so that same is locked. This locking effect may be overridden again by backward motion of the locking piston 89.

In order, for instance, to manufacture a turbine vane as is depicted as a workpiece 71 in FIG. 3, a suitable blank is firstly processed in a machining utility to produce a holding end thereon. At such end the blank is held or clamped and the curved vane surfaces are produced in one or more manufacturing stages in a conventional fashion. Since the opposite holding end, yet to be machined, is at a relatively large distance from the from the held or clamped holding end, if no further measures were taken, difficulties would occur during machining thereof. These difficulties are solved by the work holding device of the invention. The holding device 10 is firstly moved along in the longitudinal direction until it is positioned adjacent to the vane surfaces to be machined. For this purpose use is made of longitudinal guides 95, of which only one is depicted in order to make the drawing more straightforward. The power drive for moving the clasping device 10 along such longitudinal guides 95 is not illustrated either. Now the clasping device 10 is moved on transverse guides 96 perpendicularly to the longitudinal direction of the so far partially machined turbine vane, same passing right through the recess 14 as far as the clamping opening 13. The power drive for the transverse guides 96 is again not illustrated in order to make the drawing more straightforward. The clasping device 10 is consequently so positioned that the longitudinal axis of the partially machined turbine vane, i.e. the longitudinal axis of the already machined holding end of this turbine vane, coincides with the axis of rotation of the base body 11. Setting devices for height adjustment of the clasping device 10 must naturally be provided in case of need. Now the turbine vane is clamped in the base body 11 in the manner described using the shape-adjustable jaws 26. It is now possible for the as yet unmachined holding end of the turbine vane to be worked. For this purpose the partly machined turbine vane can be turned in the required fashion with the aid of the drive motor 16, such rotation also being able to be caused via the held and already worked holding end of the turbine vane. After the machining operation the shape-adjustable jaws 26 are released in the angular position of the base body 11 depicted in FIG. 1 and the clasping device 10 is moved clear of the turbine vane to the side. It is now possible for the next turbine vane to be clamped in position for a repetition of the machining operations.

In order to also clamp or hold workpieces with greatly differing forms, shape-adjustable laws 26 of different shape are held ready in a magazine which is not illustrated. Such jaws can be mounted on the slides 21 and 22 as required, for example by means of an automatic changing device, not illustrated.

In accordance with a simpler design it is possible to dispense with the slides 21 and 22, i.e. the shape-adjustable jaws 26 are directly mounted on the base body 11. The clamping or holding motion is then caused solely by the movement of the plungers 33.

For locking the clasping device 10, which is able to run along the longitudinal guides 95 and the transverse guides 96, at least in the working position, latching devices are provided (not illustrated) which may be of known design and which for example may also possess hydraulic cylinders.

Figure 7:
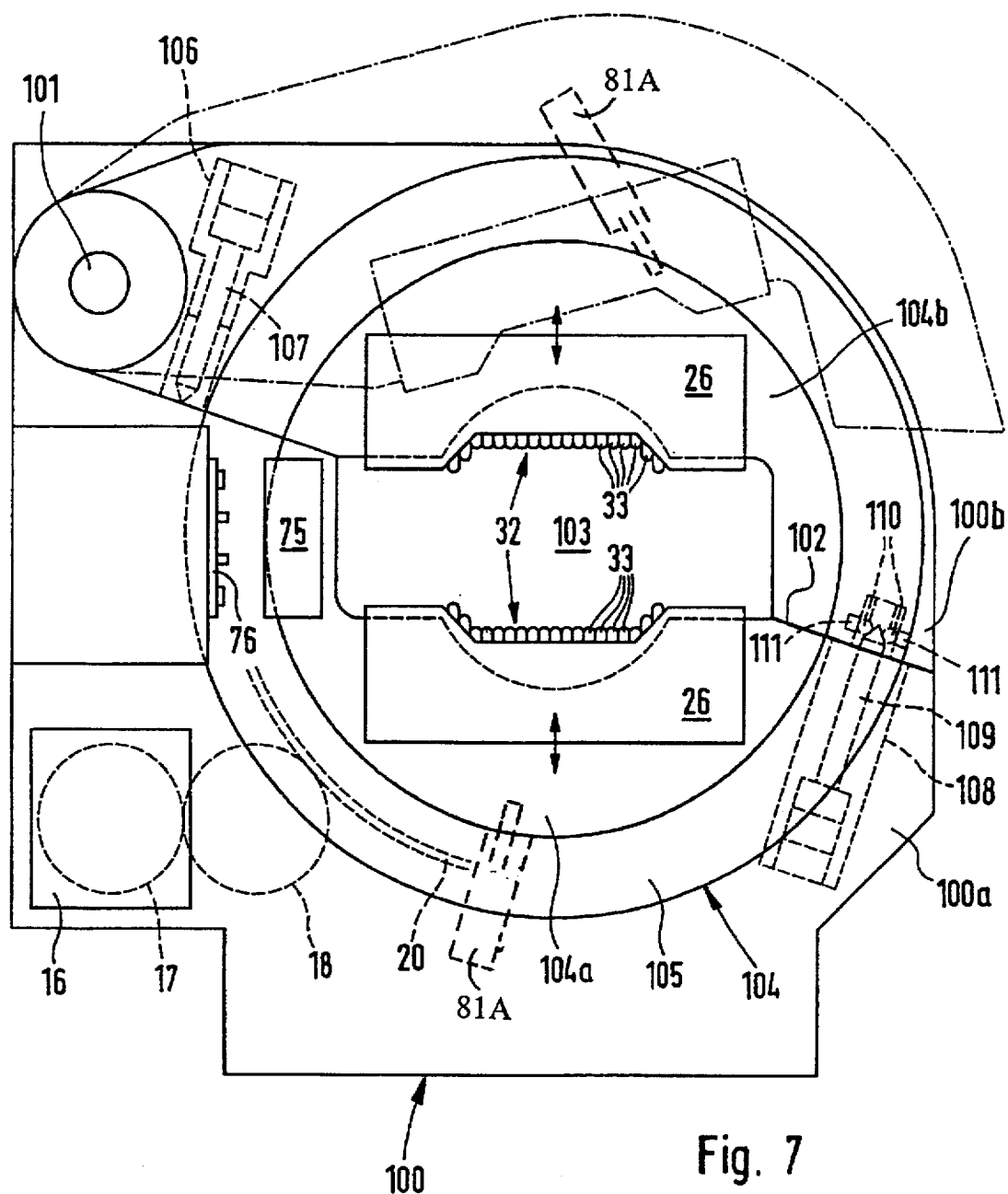
FIG. 7 is a lateral elevation of a holding device with the holding means thereof swung apart in accordance with a second embodiment of the invention.

The second embodiment illustrated in FIG. 7 comprises many separate parts and fixtures, which are the same as those of the first embodiment. Identical or functionally equivalent components, subassemblies or devices are simply referenced with the same numerals and the description thereof is not repeated.

Unlike the first working embodiment, in the second embodiment a clasping device 100 comprises two portions 100a and 100b, the portion 100b being pivotally joined with the portion 100a at a pivotal joint 101, whereas the portion 100a runs, in a manner similar to the clasping device 10 of the first embodiment on transverse guides 96 same not being depicted in FIG. 7 so that the portion 100a may for its part move along longitudinal guides 95. In this case as well power setting means can be provided. In their closed state the two portions 100a and 100b of the clasping device 100 together have a configuration which essentially corresponds to the clasping device 10 of the first working embodiment. A parting line 102 or, respectively, abutment surface between the two portions 100a and 100b extends from the top left pivotal joint 101 obliquely downward. As was the case with the first embodiment in this clasping device 101 a base body 104 with the shape of a circular disk is rotatably mounted, which as well comprises two portions 104a and 104b. In the illustrated angular setting of the base body 104 the parting line 102 is continued on through this base body 104 dividing it into the two portions 104a and 104b. In the center region of the base body 104 there is again an axially aligned through clamping opening 103 to receive workpieces which are to be held, the two shape-adjustable jaws 26 being arranged on either side of this clamping opening 103, each portion 104a and 104b bearing such a shape-adjustable jaw 26.

The movement of the shape-adjustable jaws 26 and of the plungers 33 is produced as in the first working embodiment, i.e. hydraulically via the connection member 75 and the counter-connection member 76 able to be moved in relation to same. While the hydraulic lines from the connection member 75 may be arranged in a manner which is not illustrated to extend through the portion 104a of the base body 104 to its shape-adjustable jaws 26 the hydraulic lines to the other shape-adjustable jaws 26 must be arranged through the other portion 104b past or across the parting line 102. This may be ensured using external lines (not illustrated) or using hydraulic lines integrated in the portion 104b, the hydraulic connection means being formed so as to extend across or through the parting surface constituted by the parting line 102, which parting surfaces make sealing engagement with one another in the closed state of the portions 104a and 104b.

The base body 104 has on its periphery a gear ring 105, again comprising two portions, and which as in the first working embodiment of the invention is rotatably supported on bearing rollers in the clasping device 100. In a manner which is not illustrated the bearing rollers 12 engage the gear ring 105, interlocking elements in or on the gear ring 105 preventing the two portions 104a and 104b of the base body 104 from falling out of the clasping device. In the case of such inter-locking elements it may also be a question of the bearing rollers 12 themselves. For the rotary drive of the base body 104 the drive motor 16, which is provided with the gear wheel 17, again drives the gear ring 20 of the base body 104 with the aid of a drive gear wheel 18, same being arranged in the interior of, or behind, the gear ring 105. The second drive gear wheel 19 can be eliminated in the present case since the base body 104 and accordingly the gear ring 105 respectively form a closed or unbroken circle.

For positioning the base body 104 in the angular setting depicted in FIG. 7 two hold brakes 81A are provided for the two portions 104a and 104b, such brakes being generally identical to the hold brake 81 of the first working embodiment.

For placing a workpiece to be machined between the shape-adjustable jaws 26 the upper portion 100b of the clasping device 100 together with the upper portion 104b of the base body 104 are pivoted upward. In the upwardly swung open position the upper portion 100b of the clasping device 100 then assumes the position indicated in FIG. 7 in chain lines. For automatically controlled upward pivoting use is made in this case of a hydraulic servo member 106, which is illustrated purely diagrammatically alongside the pivotal joint 101. A plunger 107 of this hydraulic servo member 106, arranged in the upper portion 100b of the clasping device 100 presses, during actuation thereof, against the parting surface, defined by the parting line 102, of the lower portion 100a and accordingly thrusts the two portions apart. Return movement can be ensured by gravity, by the force of a spring or hydraulically as well. By the same token, instead of a hydraulic servo member it is possible to use another fluid power servo member or a magnetic or electrical servo member.

In the closed state of the two portions 100a and 100b of the clasping device 100 the same are locked in relation to one another. This task is performed by a hydraulic locking device 108, which is arranged in the marginal region of the parting line 102 remote from the pivot joint 101. During operation of this locking device 108 a plunger 109, which is tapered toward its free end and is able to be slid hydraulically in the lower portion 100a, is so moved that its tapering end is inserted between the two locking members 110. If the plunger 109 is moved toward the upper portion 100b, the locking members 110 are thrust apart and snap into detent openings 111 in the upper portion 100b to produce the locking action. Here as well it is naturally possible for other known designs of locking devices to be employed.

We claim:

1. A workpiece holding device for peripherally holding a workpiece of any desired outline, comprising a base body, two shape-adjustable jaws arranged opposite one another on said base body, said jaws including a plurality of plungers able to be moved independently against said workpiece by fluid power operating means and forming gripping surfaces on said jaws and having means for arresting said plungers against said workpiece in a holding position, wherein the base body is rotatably supported in a clasping device for turning about an axis of the clasping device and possesses a connection member for the fluid power operating means of the plungers, and a counter-connection member connected with fluid power lines adapted to be thrust against the connection member and in a stationary state of the base body is able to be coupled with the base body in a certain angular setting, the base body possessing valve means for locking the holding position of the plungers in a clamping state after uncoupling the counter-connection member.

2. The workpiece holding device as set forth in claim 1, wherein the base body has the configuration of a circular disk and is peripherally supported for rotary motion.

3. The workpiece holding device as set forth in claim 2, wherein peripheral bearing means between the base body and the clasping device comprise a plurality of bearing rollers.

4. The workpiece holding device as set forth in claim 1, further comprising a drive motor for causing rotary motion of the base body.

5. The workpiece holding device as set forth in claim 4, wherein the drive motor is secured to the clasping device and possesses at least one drive gear wheel meshing with a gear ring on the base body, said gear ring being arranged on a peripheral region of the base body.

6. The workpiece holding device as set forth in claim 1, wherein the base body possesses a recess from an opening delimited by the two shape-adjustable jaws and extending laterally as far as an outer periphery of the clasping device, said opening also extending through the clasping device.

7. The workpiece holding device as set forth in claim 6, wherein the drive motor is secured to the clasping device and possesses first and second drive gear wheels meshing with a gear ring on the peripheral region the base body, said first and second drive gear wheels spaced apart a distance at least equal to the width of the recess.

8. The workpiece holding device as set forth in claim 1, wherein the base body and the clasping device are each made into two portions, the portions being kinstal apart for the introduction and removal of the workpiece to be held.

9. The workpiece holding device as set forth in claim 8, wherein the clasping device comprises a first portion running on a guide device and a second portion connected by a pivotal joint in a pivoting fashion to the first portion, a first portion of the base body being fixed in the first portion of the clasping device and a second portion of the base body being fixed in the second portion of the clasping device when the second portion of the clasping device is pivoted relative to the first portion of the clasping device.

10. The workpiece holding device as set forth in claim 8, wherein the first portion and the second portion of the base body together constitute a circular disk when the workpiece is in the holding position.

11. The workpiece holding device as set forth in claim 10, wherein such circular disk is provided with a gear ring designed in the form of a bearing ring, said gear ring also being made in two portions.

12. The workpiece holding device as set forth in claim 8, wherein a hydraulic servo member is provided for pivoting the two portions in relation to each other.

13. The workpiece holding device as set forth in claim 8, comprising fluid power operated locking means for locking the two portions of the clasping device in a closed state.

14. The workpiece holding device as set forth in claim 1, wherein the counter-connection member is moved by fluid power means.

15. The workpiece holding device as set forth in claim 1, wherein the two shape-adjustable jaws are arranged on slides and able to be moved by fluid power toward each other.

16. The workpiece holding device as set forth in claim 15, wherein said shape-adjustable jaws are able to be coupled and/or locked on the slides by fluid power means.

17. The workpiece holding device as set forth in claim 15, comprising different shape-adjustable jaws able to be secured to the slides alternatively.

18. The workpiece holding device as set forth in claim 1 comprising at least one fluid power operable hold brake for the base body.

19. The workpiece holding device as set forth in claim 18, wherein the hold brake is designed in the form of a pair of brake jaws for engaging the outer periphery of the base body.

20. The workpiece holding device as set forth in claim 1, wherein said clasping device comprises drive device means for causing horizontal movement on a guide device in either a first direction parallel to the axis of the clasping device or a second direction perpendicular to said first direction.

21. The workpiece holding device as set forth in claim 1, wherein the valve means for locking the plungers in the clamped state are designed in the form of fluid power operated shut off valves.

22. The workpiece holding device as set forth in claim 21, comprising check valves for maintaining the plunger positions after uncoupling the counter-connection member.

23. The workpiece holding device as set forth in claim 1, wherein each shape-adjustable jaw possesses a clamping band covering over the plungers.

24. The workpiece holding device as set forth in claim 23, wherein the clamping band is urged by spring force against the plungers.

25. The workpiece holding device as set forth in claim 1, wherein said fluid power operating means include hydraulic control means.

* * * * *